United States Patent [19]
Gasch et al.

[11] Patent Number: 5,406,846
[45] Date of Patent: Apr. 18, 1995

[54] PROCESS FOR DETERMINING UNBALANCE OF A DRIVEN ROTATING RIGID ROTOR

[75] Inventors: Rodolf Gasch; Michael Ruhmich, both of Berlin, Germany

[73] Assignee: Schenck Auto Service Gerate, Germany

[21] Appl. No.: 104,871

[22] Filed: Aug. 10, 1993

[30] Foreign Application Priority Data

Sep. 24, 1992 [EP] European Pat. Off. ............ 92116372

[51] Int. Cl.⁶ .............................................. G01M 1/22
[52] U.S. Cl. ..................................................... 73/462
[58] Field of Search ................. 73/462, 460, 468, 487; 364/463, 506, 508; 340/683

[56] References Cited

U.S. PATENT DOCUMENTS

| | | | |
|---|---|---|---|
| 4,419,894 | 12/1983 | Matumoto | 73/462 |
| 4,868,762 | 9/1989 | Grim et al. | 73/462 |
| 4,980,621 | 12/1990 | Müller | 73/462 |
| 5,172,596 | 12/1992 | Rothamel et al. | 73/462 |
| 5,208,758 | 5/1993 | Okumura | 73/462 |
| 5,257,541 | 11/1993 | Trommer et al. | 73/462 |

Primary Examiner—Hezron E. Williams
Assistant Examiner—Helen C. Kwok
Attorney, Agent, or Firm—Connolly & Hutz

[57] ABSTRACT

A process determines the unbalance of a driven rotating rigid rotor with respect to at least one compensation plane of the rigid rotor according to relative position and size. The unbalance effect is determined in that the position and size of the oscillations caused by an unbalance in the subcritical range in at least one segment of a rotation of the rigid rotor are determined at least twice on at least one support of the rigid rotor. The time intervals between the individual determinations during at least one segment of the rotation are taken into account, and the change of the dynamic effect due to the acceleration is taken into account during at least one segment of the rotation.

9 Claims, 1 Drawing Sheet

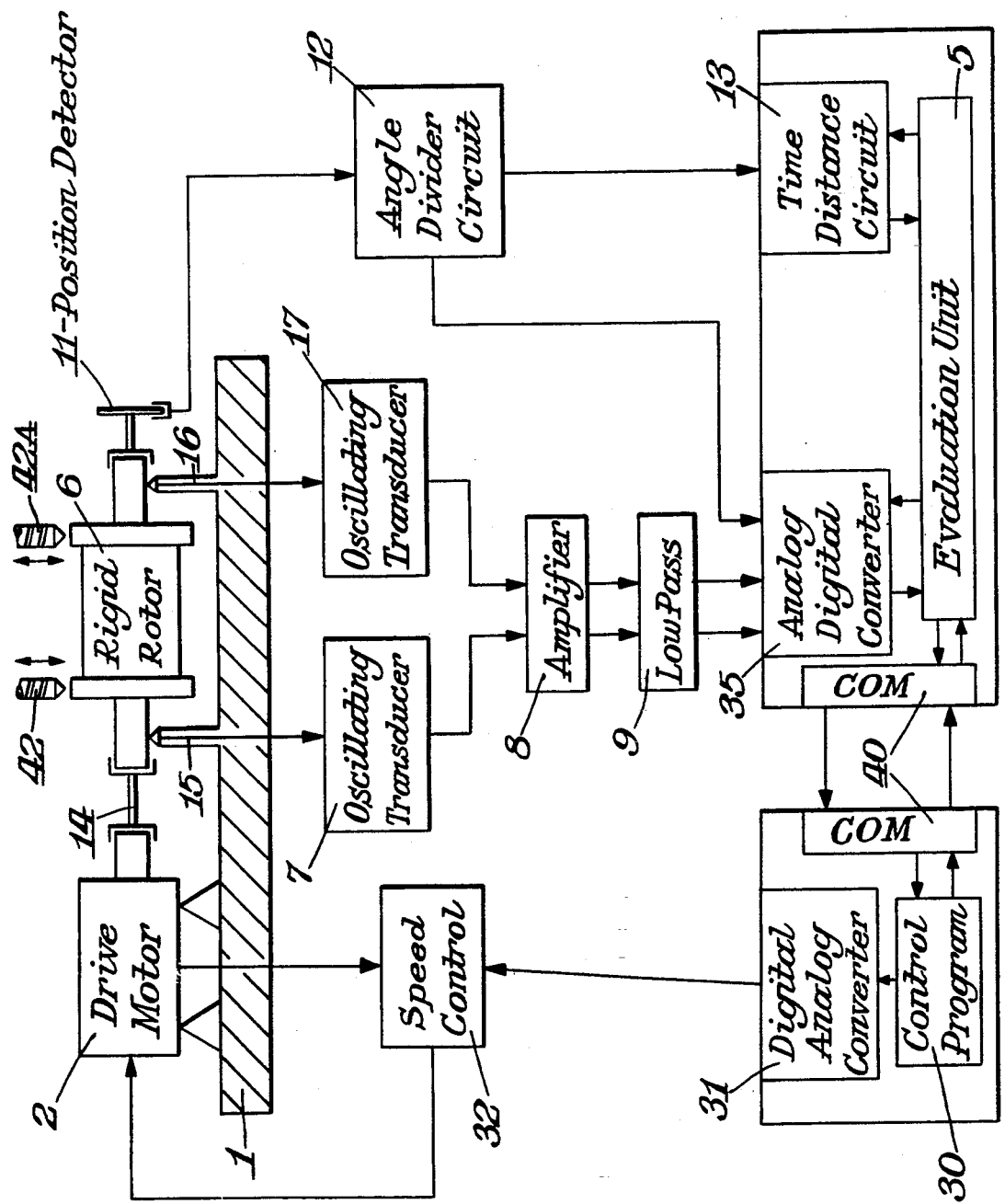

PROCESS FOR DETERMINING UNBALANCE OF A DRIVEN ROTATING RIGID ROTOR

BACKGROUND OF THE INVENTION

The present invention relates to a process for determining the unbalance of a driven rotating rigid rotor with respect to at least one compensation plane of the rigid rotor according to relative position and size.

A rotor to be balanced is considered to be a rigid rotor as long as it is driven below its first critical speed and whereby the effects of the unbalance are determined by means of oscillation transducers on the support stands of a balancing machine in which the rigid rotor to be examined is mounted.

In this context, two different possibilities for balancing are distinguished. First subcritical balancing where the characteristic frequency of the system "rotor in its balancing supports" is higher than the speed at which the rigid rotor to be examined is being driven. Secondly, there is a type of supercritical or soft balancing machine where the critical speed of the system "rotor in its balancing supports" is smaller than the speed at which the rigid rotor is being driven.

Regardless of subcritical or supercritical support of the rigid rotor to be examined, until now, the measurement of the effect of the unbalance has been carried out at a constant speed of the rigid rotor to be examined, whereby, in order to obtain as accurate a measurement as possible of the relative position and of the size of the unbalance effect in the two support stands, it is necessary to carry out several measurement rotations. As a result of the necessary acceleration time, the measuring time and the braking time, there is a lower limit for the balancing time for the duration of a measuring operation, below which the operation cannot fall due to physical reasons.

It is also a known procedure, by using a so-called coasting machine, to support the rigid rotor to be examined in a balancing machined to use the driving motor in order to accelerate the rotor to a speed of the rigid rotor to be examined which is higher than the measuring speed. Subsequently, the rigid rotor is disengaged from the motor and, while it is coasting, the unbalance oscillations are determined in the support stands on the basis of relative position and size. Such methods are even more time-consuming when the rigid rotor to be examined is not additionally braked after having gone beyond the measuring speed.

From the VDI Progress Reports, Series 11, No. 143, Dusseldorf, VDI Publishers 1991 "Balancing Flexible Rotors After Only One Transient Measuring Operation" by M. S. Rama de Silva, it has become known to balance flexible rotors after only one transient measuring operation in such a manner that, during the passage of the flexible rotor through its different critical speeds, by picking up the wave shape of the rotor at various places on the rotor, measured values are obtained on the basis of which a subsequent balancing of the rotor is possible. The rotor no longer displays any excursions when passing through the critical speeds once again. In order to balance this rotor in the subcritical range as well, that is, in order to eliminate the effects of the unbalance on the supports, with such a rotor it is necessary to carry out one more measuring operation in the subcritical range. Such a procedures however, is extremely time-consuming, since the rotor in this speed range must be seen as a rigid element whose support forces have not yet been eliminated. For this purpose, it would have to be once again accelerated to a measuring speed below the first critical speed, and several measurements would have to be made at this measuring speed. Then the element would have to be braked once again.

Moreover, one should also note that the measuring speeds of rigid rotors are subject to a certain fluctuation so that, in spite of a larger number of measurements during the measuring operation, the quality of the unbalance measurement is additionally influenced.

SUMMARY OF THE INVENTION

In view of this state of the art, the present invention is based on the task of—independent of the momentary speed of a rigid rotor—determining its unbalance effect within the shortest possible time. For the first time, it has become possible to carry out a transient unbalance measurement of a rigid rotor by means of the measurement according to the invention of the position and size of the oscillation caused by an unbalance in the subcritical range in at least one segment of a rotation of the rigid rotor. The effects of the unbalance oscillation are determined at least twice on at least one support of the rigid rotor, and at the same time, the time intervals between the individual determinations during at least one segment of the rotation are taken into account. The change of the dynamic effect due to the acceleration is taken into account during at least one segment of the rotation. This considerably reduces the time needed until now while maintaining the same measuring quality familiar with multiple measurements made so far, which are more time consuming. At the same time, the error which was caused by the speed fluctuations of a constant measuring speed is eliminated. Therefore, the present invention can also be used for balancing as it was carried out until now in order to eliminate the error of the measuring speed fluctuations.

In one embodiment of the invention, the rigid rotor, preferably controlled by an adjustable speed program, is started up and then, after reaching a maximum speed, brought to a standstill again. Thus, for the first time, with an appropriate design of the drive motor and with just one single rotation of the rigid rotor to be examined, it is possible to determine its measurement with respect to the unbalance effects which occur at the support sites.

In another embodiment of the process, the speed program follows a sine-square-proportional speed course. As a result, a considerable speed differential can be achieved within a very short period of time for at least two determinations.

In another embodiment of the invention, the position and size of the oscillations caused by the unbalance are determined during the acceleration phase and/or the coasting phase of the rigid rotor. This embodiment stands out for the fact that control measurements can also be carried out during the coasting phase and can be compared with the values of the acceleration phase until the time of the standstill. Even greater improvement in the quality of the balancing can be achieved.

In still another embodiment of the invention, it is proposed to carry out the determination of the position and size of the oscillations caused by the unbalance in the range of the maximum rotations of the rigid rotor. This makes it possible to bring the rotor to a standstill in the fastest feasible manner after the measurement.

In another embodiment of the process, after the determination of the unbalance according to position and size, the rigid rotor is braked in such a way that it comes to a standstill in a predefined position, particularly with respect to a tool which eliminates the unbalance. In this embodiment, the total balancing time is shortened, if the balancing time is defined as the time needed to determine and compensate for the unbalance.

BRIEF DESCRIPTION OF THE DRAWING

Novel features and advantages of the present invention in addition to those noted above will become apparent from a reading of the following detailed description in conjunction with the accompanying drawing wherein similar reference characters refer to similar parts and in which the single FIGURE of drawing is a schematic representation of a balancing machine with a supported rigid rotor and an electronic unit for evaluation of the values obtained in the measuring operation, according to the present invention.

DETAILED DESCRIPTION OF THE INVENTION

According to the present invention, a drive motor 2 rests on a support bed 1. The motor is connected via a coupling 14 with the rigid rotor 6 to be examined. The rigid rotor 6 to be examined rests on rigid supports 15, 16 which are equipped with oscillation transducers 7, 17. The oscillations caused by the unbalance of the rigid rotor 6 to be examined are picked up by the oscillation transducers 7, 17 preferably in only one direction (horizontal or vertical) as an excursion signal or dynamic effect and transmitted to an evaluation unit.

The oscillation transducers 7, 17 can be force-measuring, speed-measuring or acceleration-measuring transducers.

Moreover, on the rigid rotor 6 to be examined or on the free end of the drive train, there is a relative position detector 11 which is designed, for example, as a coding disk and which likewise transmits a certain number of angle pulses to the evaluation unit 5 per rotation of the rigid rotor 6 to be examined.

Via a control program 30 connected to the evaluation unit 5 by COM 40 by means of a digital-analog converter 31, a given speed control 32 is specified for the drive motor 2, for example, a sine-square-shaped speed change. COM 40 provides a serial interface between control program 30 and evaluation unit 5. Via the coupling 14 or directly coupled with the drive, the rigid rotor 6 to be examined starts to move in accordance with the control program 30 and, via the relative position detector 11, the individual pulse lengths, which depend on the rotation status, are measured by means of a time-distance circuit 13 in conjunction with an angle divider circuit 12 and transmitted to the evaluation unit 5. At the same time, controlled by this angle divider circuit 12, the forces exerted on the rigid supports 15, 16 are picked up by the oscillation transducers 7, 17 and likewise transmitted to the evaluation unit 5 by means of an amplifier 8, a low pass 9 and an analog-digital converter 35. In the evaluation unit, the change of the dynamic effect caused by the acceleration is also taken into consideration. Tools 42, 42A eliminate unbalance at predefined positions on the rigid rotor 6.

What is claimed is:

1. A process for determining unbalance of a driven rotating rigid rotor with respect to at least one compensation plane of the rigid rotor according to relative position and size, the process comprising the steps of supporting the rigid rotor at opposite ends, rotating the rotor, determining, at least twice on at least one support of the rigid rotor, the position and amount of unbalance oscillations caused by an unbalance in the subcritical range in at least one segment of a rotation of the rigid rotor, taking into account the time intervals between the individual determinations during at least one segment of the rotation, and taking into account the change of the dynamic effect due to an acceleration during at least one segment of the rotation.

2. A process as in claim 1 including the step of starting rotation of the rigid rotor by an adjustable speed program, and then, after reaching a maximum speed, bringing the rotor to a standstill.

3. A process as in claim 2 wherein the course of the speed program over time follows a sine-square curve.

4. A process as in claim 1 wherein the position and size of oscillations caused by unbalance are determined during an acceleration phase of the rigid rotor.

5. A process as in claim 1 wherein the position and size of oscillations caused by unbalance are determined during a coasting phase of the rigid rotor.

6. A process as in claim 1 wherein the determination of the position and amount of the unbalance oscillations caused by the unbalance is carried out in the range of maximum rotational speed of the rigid rotor, 7. A process as in claim 1 including the step of braking the rigid rotor after determination of unbalance according to position and size of said rotor in such a way that the rotor comes to a standstill in a predefined position.

8. A process as in claim 7 including the step of locating a tool which eliminates unbalance at the predefined position.

9. A process as in claim 1 wherein the position and amount of unbalance oscillations caused by unbalance are determined by measurement of excursions and dynamic effects.

* * * * *